Jan. 18, 1927.  1,614,772
A. BAMBINI ET AL
KNIFE GUARD
Filed Nov. 25, 1925
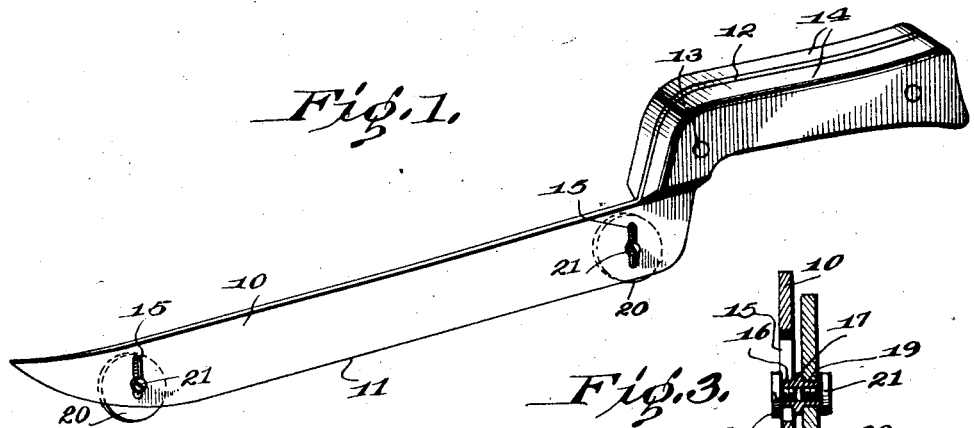
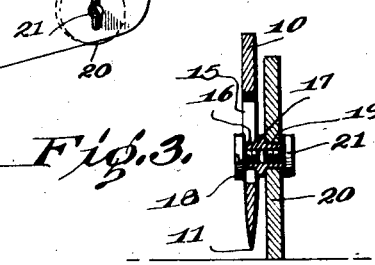
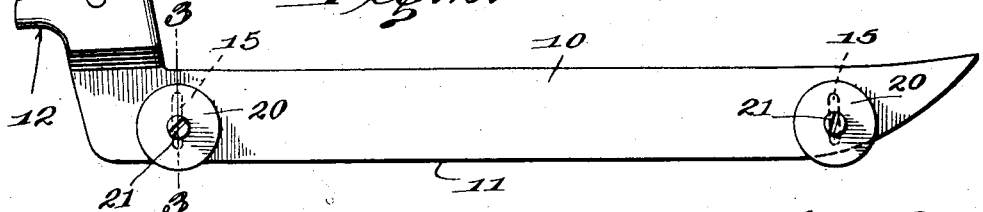
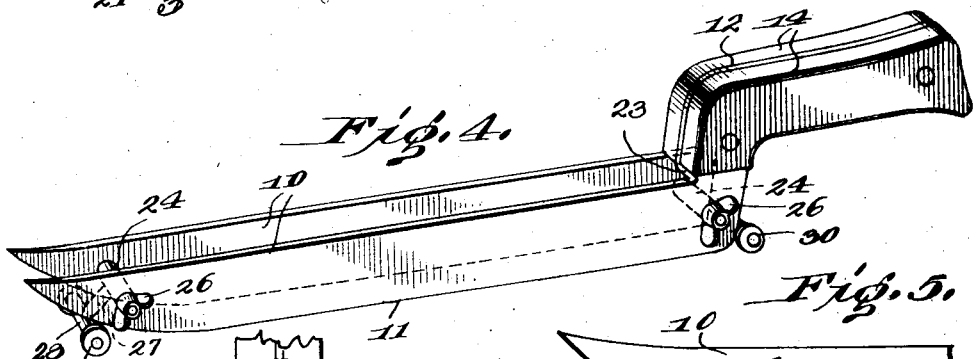
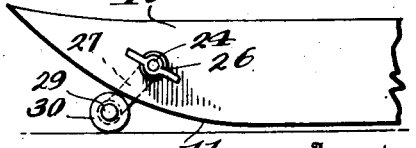
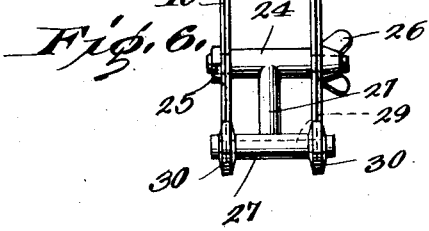
Inventor
Aurelio Bambini.
Cesare Nascivera
By
Attorney Patented Jan. 18, 1927.

1,614,772

UNITED STATES PATENT OFFICE.

AURELIO BAMBINI AND CESARE NASCIVERA, OF McKEES ROCKS, PENNSYLVANIA.

KNIFE GUARD.

Application filed November 25, 1925. Serial No. 71,341.

The present invention relates to a knife guard and aims to provide a novel and improved device of this character comprising means for engaging the surface the object to be cut or sliced rests upon for preventing the sharp edge of the blade of the knife from coming into contact with such surface, thus eliminating the danger of cutting or marring such surface.

Another object of the invention is the provision of rollers arranged on the blade of a knife for contacting with the surface the object to be sliced or cut rests upon, thus holding the edge of the blade slightly spaced from said surface, said rollers providing a means for permitting the easy sliding of the knife during the slicing and relieving any friction when said rollers are engaging the surface.

A further object of the invention is to adjustably mount the rollers on the knife blade in order that the same may be adjusted as the blade wears due to continual usage.

A still further object of the invention is to provide a knife as above outlined having the handle thereof offset or raised to eliminate the danger of the user's knuckles striking against the surface the object to be cut or sliced rests upon, and for permitting the blade of the knife to resume a position to almost entirely sever the object.

It is also an object of the invention to provide a device of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed it being understood that changes can be made within the scope of what is claimed, without departing from the spirit of the invention.

The invention is illustrated in the accompanying drawing, wherein:

Figure 1 is a perspective view of my improved knife,

Figure 2 is a side elevation thereof, showing a portion of the handle broken away.

Figure 3 is a vertical section taken on line 3—3 of Figure 2,

Figure 4 is a perspective view of the knife showing a modified form,

Figure 5 is a fragmentary elevation of the blade of the knife, and

Figure 6 is a fragmentary end elevation of the form of the invention illustrated in Figure 4.

In carrying out the invention, the numeral 10 designates a knife blade provided with a cutting edge 11, and having an offset shank portion 12 extending away from the cutting edge 11. On the opposite sides of the offset shank portion 12 are attached, by means of rivets 13 or the like, side plates 14 for constructing a handle. It will be noted that by offsetting the shank portion 14 that the handle of the knife is raised from the surface an object is placed upon to be cut by the cutting edge 11 of the blade, thus eliminating the tendency of the user of the knife from striking his knuckles against such surface.

The blade 10 has provided adjacent each end thereof a vertical slot 15 through which are extended shank portions 16 of hub structures 17. The hub structures 17 are adjustably clamped to the blade by means of headed screws 18 extending into the shank portions 16 of said hub structures, said hubs being adjustable vertically in the slots 15. On the opposite ends of the hub structures 17 from that having the shank portions 16 are provided other shank portions 19, which have rotatably mounted thereon rollers 20, said rollers being held on said shank portions 19 by means of screws 21 threaded therein and provided with enlarged heads for engaging the sides of the rollers adjacent their bearings.

By loosening the screws 18 extending into the shank portions 16, the hub structures 17 may be adjusted vertically with relation to the knife blade in order to position the rollers so as to engage the surface an object rests upon which is to be cut or sliced, while the cutting edge 11 is held slightly spaced from said surface by the rollers. By spacing the cutting edge 11 from the surface, it can be seen that bread or a like article may be sliced without danger of cutting or marring the surface upon which the bread rests or cutting a table cloth should the bread be resting thereon. As the blade 10 wears due to continual usage, the rollers 20 may be adjusted upwardly to space the cutting edge properly from the surface engaged by said rollers. It will be noted that the rollers are positioned upon the ends of the cutting blade 10, thus leaving a relatively long surface for use in cutting or slicing. By offsetting the handle of the knife in a raised position, it will be noted that both of the rollers 20 may engage the surface thus completing the cutting operation with the handle spaced a sufficient distance therefrom so as not to interfere with the complete cutting of the blade 10.

In Figures 4, 5, and 6 of the official drawing, we have shown a modified form of invention, wherein we have provided a pair of cutting blades 10, one of which carries the shank portion 12, but has said shank portion offset to one side, as at 23. By providing the offset portion 23 both blades 10 will be spaced the same distance from the point of center of the handle, as the blade 10 not having the shank portion 12 is attached to the other blade by means of cross members 24 which have their opposite ends reduced and extending through said blades. On the blade 10 not having said shank portion 12 nuts 25 are provided upon the reduced ends of the members 24 for holding the blade attached thereto, while on the opposite reduced extensions of the members 24 are arranged wing nuts 26 for binding against the sides of the blade 10 in order to hold said members 24 against turning movement.

Secured to the members 24 and extending downwardly are connecting members 27 which have their lower ends secured to sleeve members 28, which in turn receive pins 29 which have arranged on their opposite ends rollers 30, said rollers being arranged in alignment with the cutting blades 10. It will be noted by referring to Figure 4 that the members 24 are pivotally connected to the blades at points where said blades turn upwardly, thus permitting up and down adjustment of the rollers when wear takes place on the cutting edges of the blades. By loosening the wing nuts 26 and swinging the rollers about the point of pivot of the member 24 the same can be arranged slightly below the cutting edges of the blades 10, thus holding said blades slightly spaced from the surface upon which an article rests to be cut. It will be noted that by providing a pair of blades, arranged side by side, that two slices or cuts may be made during the same operation of the knife, thus eliminating the amount of work necessary in cutting or slicing an object.

Having thus described our invention, what we claim as new is:

1. A device of the character described comprising a knife blade, a roller carried at each end of said blade and having portions thereof arranged slightly below the cutting edge of said blade.

2. A device of the character described comprising a knife blade, a roller carried at each end of said blade and having portions thereof arranged slightly below the cutting edge of said blade, and means for permitting adjustment of said rollers on said blade.

3. A device of the character described comprising a knife blade having an opening arranged in each end thereof, hub structures arranged in said openings and being vertically adjustable therein, and rollers mounted on said hub structures and arranged to have portions thereof positioned slightly below the cutting edge of said blade.

4. A device of the character described comprising a knife blade having a vertical slot arranged therein adjacent each end thereof, a hub structure slidably mounted in each of said slots, means for clamping said hub structures against sliding movement in said slots, and rollers mounted on said hub structures and having portions thereof adjustably arranged slightly below the cutting edge of said blade.

5. A device of the character described comprising a knife blade having a vertical opening arranged therein at each end thereof, a pair of hub structures each having a reduced shank formed on one end thereof for slidably supporting the same in one of said slots, screws threaded in said shank portions for adjustably clamping said hub structures to said knife blade, and rollers mounted on said hub structures and having portions thereof arranged slightly below the cutting edge of said blade.

6. A device of the character described comprising a knife blade, an offset shank formed on said blade and extending away from the cutting edge thereof for forming a handle positioned above the cutting edge of said blade, and rollers carried by said blade and having portions thereof arranged slightly below the cutting edge of the same.

7. A device of the character described comprising a knife blade, a handle arranged upon said knife blade and being offset slightly above the same, and a roller arranged upon each end of said knife blade and having portions thereof extending slightly below the cutting edge of said blade.

In testimony whereof, we have affixed our signatures.

AURELIO BAMBINI.
CESARE NASCIVERA.